(12) United States Patent
Ricci et al.

(10) Patent No.: US 6,427,567 B1
(45) Date of Patent: Aug. 6, 2002

(54) DRIVE MOTOR MOUNT FOR CLAMSHELL LATHE

(75) Inventors: Donato L. Ricci, W8477 - 162$^{nd}$ Ave., Hager City, WI (US) 54017; Brent Place, Red Wing, MN (US)

(73) Assignee: Donato L. Ricci, Hager City, WI (US)

( * ) Notice: Subject to any disclaimer, the term of this patent is extended or adjusted under 35 U.S.C. 154(b) by 56 days.

(21) Appl. No.: 09/596,155

(22) Filed: Jun. 16, 2000

(51) Int. Cl.$^7$ ................................................. B23B 5/08
(52) U.S. Cl. ............................. 82/113; 82/128; 82/119
(58) Field of Search ........................... 82/113, 128, 147, 82/173, 119, 905; 30/96, 97

(56) References Cited

U.S. PATENT DOCUMENTS

| | | | |
|---|---|---|---|
| 3,783,955 A | * 1/1974 | Gill | 82/113 |
| 4,236,428 A | * 12/1980 | Feamster, III | 82/113 |
| 4,656,898 A | * 4/1987 | Hunt et al. | 82/113 |
| 4,739,685 A | 4/1988 | Ricci | |
| 4,939,964 A | 7/1990 | Ricci | |
| 5,492,183 A | * 2/1996 | Sollami | 173/216 |
| 5,549,024 A | 8/1996 | Ricci | |
| 6,102,632 A | * 8/2000 | Potter et al. | 408/124 |

* cited by examiner

*Primary Examiner*—Henry Tsai
(74) *Attorney, Agent, or Firm*—Nikolai & Mersereau, P.A.

(57) ABSTRACT

An improved motor mount for attaching a drive motor to a clamshell lathe includes a gear box whose angular disposition can be adjusted relative to a drive gear housing affixed to the periphery of the clamshell lathe. This facilitates the positioning of the clamshell lathe on a workpiece with reduced chance of interference of the drive motor with neighboring obstructions.

1 Claim, 3 Drawing Sheets

DRIVE MOTOR MOUNT FOR CLAMSHELL LATHE

BACKGROUND OF THE INVENTION

I. Field of the Invention

This invention relates generally to portable metal finishing machines, and more particularly to split ring clamshell lathes of the type used to refurbish pipes, casings, engine shafts and the like in the field.

II. Discussion of the Prior Art

Split ring clamshell lathes of the type described herein are known in the art. U.S. Pat. Nos. 5,549,024, 4,739,685 and 4,939,964 to D. L. Ricci are illustrative of the technology involved. The split frame clamshell lathe generally comprises first and second semi-circular segments that are designed to be joined together so as to surround the pipe or shaft to be machined. The resulting annular assembly includes a stationary ring portion that becomes clamped to the workpiece and an abutting rotatable portion, including a ring gear, that is journaled to the stationary portion for rotation about the concentrically disposed workpiece. An air-operated, hydraulically-operated or an electrically-operated motor is operative coupled to the assembly and includes a drive gear designed to mesh with the ring gear on the rotatable segment of the clamshell lathe. Also mounted on the rotatable segment of the clamshell lathe is a tool block for supporting a cutting tool that can be made to advance in the radial direction against the pipe to be machined in incremental steps upon each revolution of the ring gear.

In these prior art arrangements, the drive motor mounts to the outside diameter of the stationary annulus and projects parallel to the longitudinal axis of the workpiece clamped within the central opening of the clamshell lathe. It frequently happens that in the field the pipe or shaft to be machined is in close proximity to neighboring structures which frequently make it difficult to place the clamshell lathe about the pipe or shaft to be turned. The motor, which typically projects approximately 18–20 inches either rearward or forward of the ring assembly, is a common source of difficulty in the desired placement of the clamshell lathe. Thus, a need exists for a motor mount fixture that will afford greater flexibility in the placement of a clamshell lathe.

The present invention affords a solution to the foregoing problem. In particular, it provides a motor mount that allows the motor to be selectively disposed at a plurality of different angular dispositions in a plane parallel to the plane of the clamshell lathe ring structures. As such, the motor position can be adjusted to avoid any nearby structures that might otherwise interfere with a desired placement of the clamshell lathe relative to the workpiece to be machined. This ease of set-up is especially important when working in environments where exposure to nuclear radiation must be kept to a minimum.

SUMMARY OF THE INVENTION

The foregoing objects, features and benefits of the invention are achieved by providing a motor mount for a clamshell lathe that comprises a drive gear housing that is adapted to be clamped or otherwise fixedly attached to the non-rotatable ring member of the clamshell lathe along with a gear box that is attachable to the drive gear housing at any one of a plurality of selectable angular positions. A first shaft is journaled for rotation in the drive gear housing and the gear box. This first shaft carries the pinion gear that mates with the clamshell's ring gear periphery, and a bevel gear is arranged to mesh with an input bevel gear that is journaled for rotation within the gear box. The input bevel gear, in turn, is adapted to be driven by one of an air motor, an electric motor or a hydraulic motor.

To provide a desired angular disposition of the drive motor relative to the clamshell lathe assembly, there is attached to the drive gear housing an annular bracket that is provided with a plurality of regularly, circumferentially-spaced threaded apertures extending through its thickness dimension for receiving the threaded ends of at least one bolt passing through and aperture(s) in the gear box housing.

DESCRIPTION OF THE PREFERRED EMBODIMENT

Figure 1:
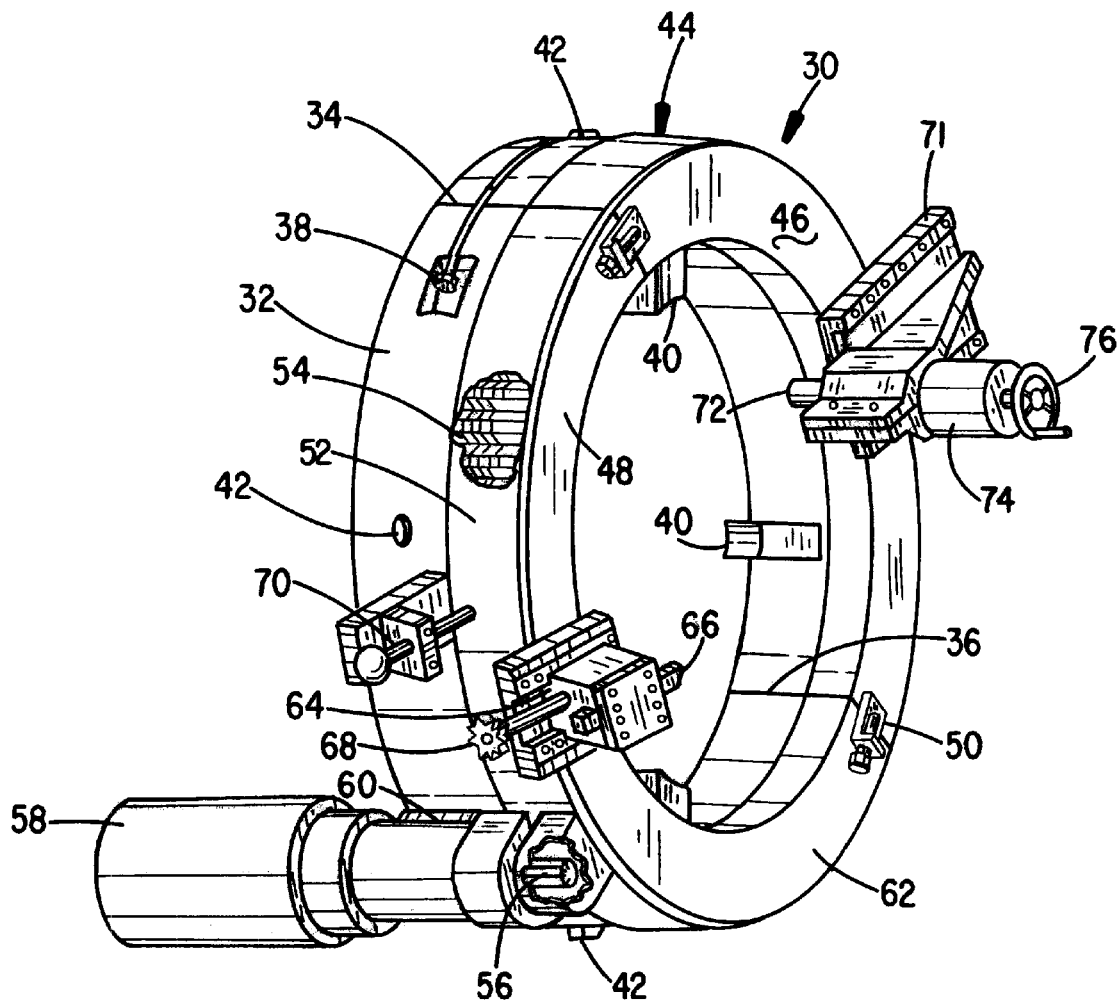
FIG. 1 is a perspective view of a clamshell lathe having a prior art motor mount for coupling a drive motor to the lathe.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof Said terminology will include the words above specifically mentioned, derivatives thereof and words of similar import.

To better understand the present invention, it is deemed helpful to first describe a typical prior art motor mount for a clamshell lathe. In this regard, reference is made to FIG. 3 of U.S. Pat. No. 5,549,024, the contents of which are hereby incorporated by reference as if fully set forth herein. Referring to the reference numerals used in the '024 patent, there is bolted or otherwise affixed to the stationary annular member 32, a mounting bracket 60, including a radially extending arcuate shield member disposed in covering relation to a spur gear 56, that meshes with the teeth of a ring gear 54. The drive motor 58 is seen to project rearward from the mounting bracket 60 so as to extend parallel to the central axis of the clamshell annulus. As is mentioned in the introductory portion of this specification, the orientation of the motor 58 is fixed and because it may typically be approximately 20 inches in length, it may frequently interfere with placement of the clamshell lathe at a desired location along the length of the workpiece to be machined.

Figure 2:
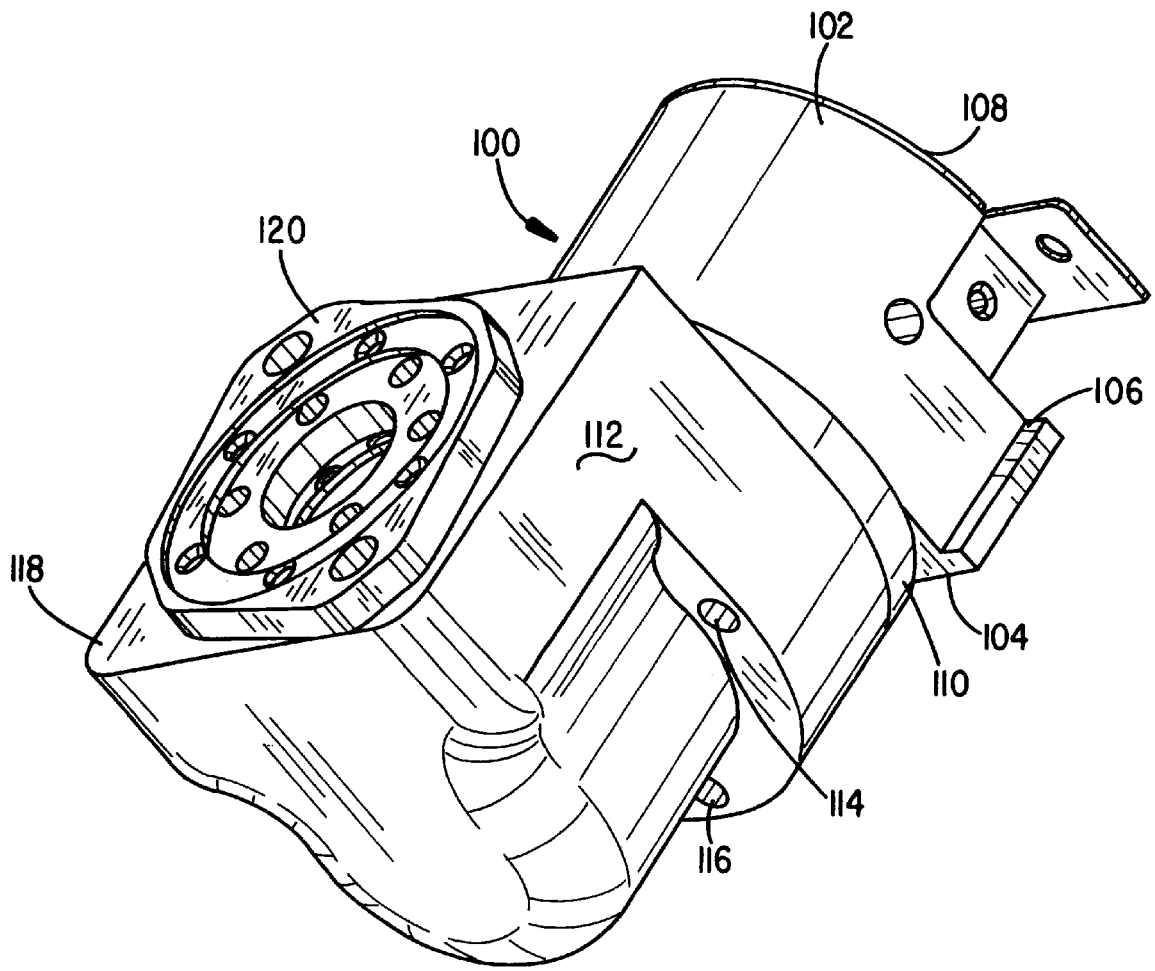
FIG. 2 is a perspective view of the preferred embodiment.

Referring next to FIG. 2, there is shown a perspective view of the improved clamshell lathe motor mount constructed in accordance with the present invention. The motor mount assembly is indicated generally by numeral 100 and comprises a drive gear housing member 102 having a planar base 104 with laterally extending flanges 106 projecting from opposed side edge surfaces thereof The flanges 106 are adapted to be engaged by clamping members (not shown) that are attached to the stationary ring of the clamshell lathe. The housing 102 has opposed parallel faces with a cylindrical cavity extending therebetween. The front face is covered by a cover plate 108 that attaches to the drive gear housing 102 by threaded screws.

Shown bolted to the opposite side surface of the drive gear housing is an annular bracket 110 and attached to it is a gear box 112. The gear box 112 attaches to the annular bracket 110 by means of bolts (not shown) passing through apertures, as at 114 and 116, formed in an arcuate flange portion 117 of the gear box and into threaded apertures in the annular bracket 110. Secured to a planar face 118 of the gear box 112 is a motor adapter plate 120 to which a drive motor can be attached.

As will be explained further in greater detail with the aid of FIG. 3, the gear box can be rotated relative to the drive gear housing such that the motor, like that identified by numeral 58 in FIG. 1, will extend generally parallel to the plane of the ring members of the clamshell lathe and can be swung through 360° to orient the motor in any one of a plurality of angular dispositions. The manner in which this is accomplished will now be explained with the aid of the exploded view of FIG. 3.

Figure 3:
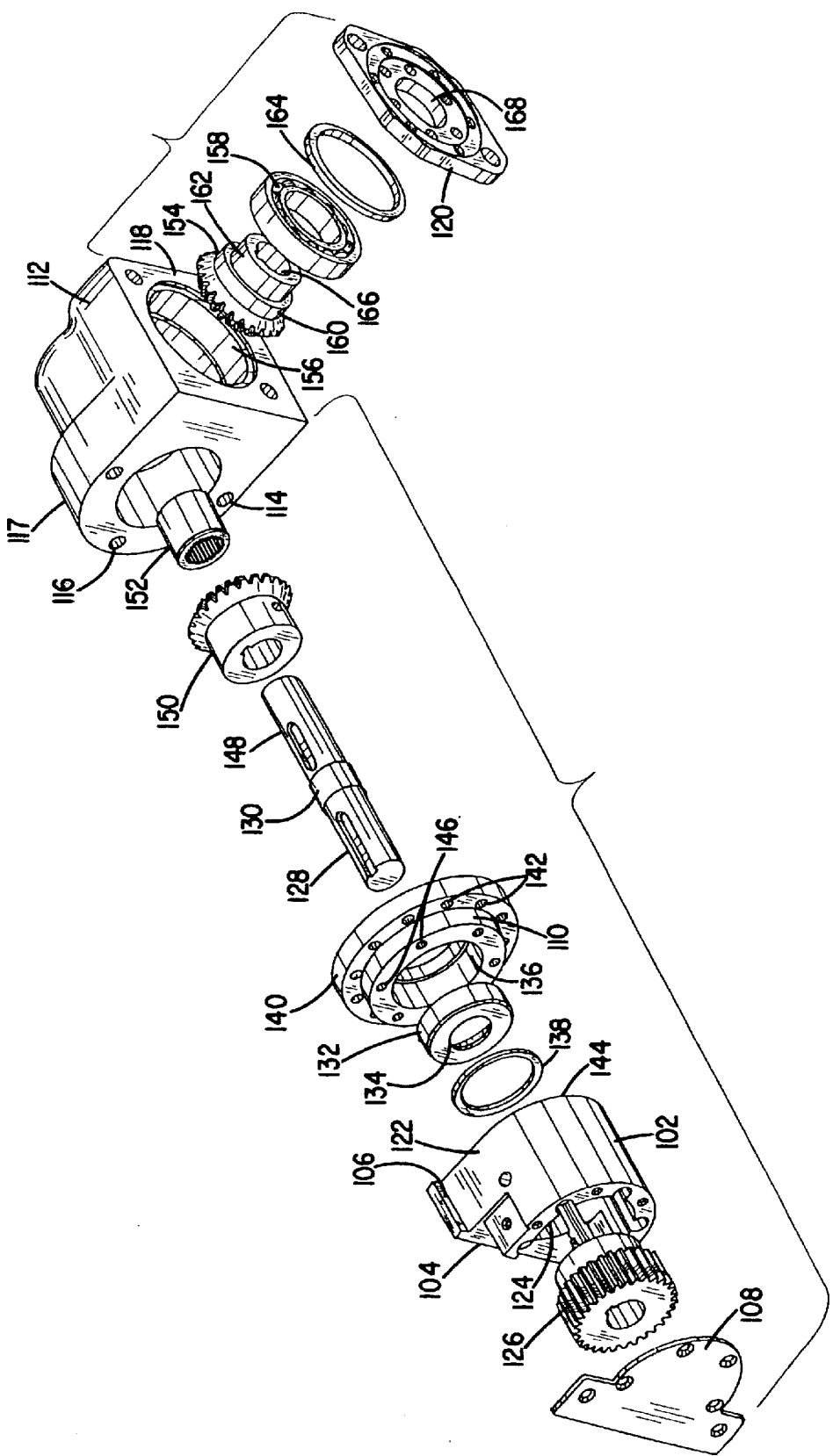
FIG. 3 is an exploded perspective view illustrating the parts comprising the motor mount of the present invention.

In FIG. 3, the drive gear housing 102 is seen to comprise an aluminum or steel block 122 having a cylindrical wall contoured to surround a cylindrical bore 124 that is dimensioned to contain a spur gear 126. The gear 126 is keyed to the left end portion 128 of a drive shaft 130. The shaft 130 is journaled for rotation by Timken bearings 132 and 134 that fit within an enlarged central bore 136 of the annular mounting bracket 110. A suitable bushing 138 is also preferably used in combination with the Timken bearings to journal the left end of the shaft 130.

The annular bracket 110 has a flange portion 140 with a plurality of regularly spaced apertures 142 extending therethrough. Without limitation, the apertures may be twelve in number and may be spaced at 30° intervals around the circumference of the flange. The bracket 110 is adapted to be bolted to the rear face 144 of the drive gear housing 102 by screws passing through screw holes or apertures 146 that extend through the thickness dimension of the annular mounting bracket 110.

Keyed to the right end portion 148 of the shaft 130 is a miter gear 150. The shaft 148 passes completely through the miter gear 150 and into needle roller bearings 152 which fit within an appropriately sized cylindrical cavity (not shown) in the gear box 112. The miter gear 150 is adapted to mesh with a miter gear 154 that is journaled for rotation within a cylindrical bore 156 of the gear box. More specifically, a radial bearing 158 fits over a journal surface 162 of the miter gear 154 and a bushing 164 is disposed between the bearings 158 and the drive motor adapter plate 120 that bolts to the flat planar base 118 of the gear box. The miter gear 154 has a bore 166 centrally disposed therein and which is accessible through a bore 168 in the drive motor adapter plate 120. As such, the drive shaft of a drive motor, like that shown in FIG. 1, can be inserted, along with a key, into the bore 166 to provide a driving force to the miter gear 154 and through the shaft 130 to the spur gear 126 to drive the rotatable member of the clamshell lathe.

To set the angular disposition of the drive motor, the bolts (not shown) that are made to pass through the bolt holes as at 114, 116, in the gear box are removed. When the bolts are removed, the gear box can be rotated in 300 increments which is the spacing of the bolt holes 142 formed in the annular bracket 110 in the embodiment illustrated. With the motor projecting in a desired direction, the bolts are reinserted through the apertures 114, 116 and into the bolt holes 142 with which the apertures 114 and 116 are now aligned.

The ability to adjust the angular disposition of the gear box relative to the drive gear housing and the fact that the motor extends parallel to the plane of the clamshell lathe facilitates the mounting of the clamshell lathe on a workpiece without interfering with any surrounding structures that may be present.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself

What is claimed is:

1. An adjustable motor mount for a clamshell lathe comprising:

(a) a drive gear housing having a planar base, first and second parallel faces extending perpendicularly to the planar base and a circular bore extending between the first and second parallel faces, the planar base being adapted to be connected to a clamshell lathe having a ring gear drive;

(b) a spur gear disposed on a shaft journaled for rotation within the drive gear housing and adapted to engage the ring gear drive of the clamshell lathe;

(c) a gear box having a planar base with an arcuate flange projecting perpendicularly from the gear box base, the gear box including a first bore extending through the gear box base and a second bore extending through the arcuate flange to intersect with the first bore at a right angle, said arcuate flange further including at least two bolt holes extending through it in a direction parallel to the second bore;

(d) a first bevel gear journaled for rotation in the first bore and a second bevel gear journaled for rotation in the second bore to mesh with the first bevel gear, the second bevel gear mounted on the shaft on which the spur gear is disposed; and (e) an annular bracket bolted to the second face of the drive gear housing, the annular bracket having a radially extending annular flange, the annular flange including a plurality of equally circumferentially spaced apertures formed therethrough and adapted to receive bolts passing through the at least two bolt holes in the arcuate flange of the gear box and into selected ones of the plurality of apertures, whereby the gear box base can be set at a desired angle between 0° and 360° with respect to the planar base of the drive gear housing.

* * * * *